United States Patent
Tolkin et al.

(10) Patent No.: US 10,685,416 B2
(45) Date of Patent: Jun. 16, 2020

(54) SUGGESTED PICKUP LOCATION FOR RIDE SERVICES

(71) Applicant: Uber Technologies, Inc., San Francisco, CA (US)

(72) Inventors: Brian Tolkin, San Francisco, CA (US); Qing Xu, Milpitas, CA (US); Sami Aref, San Francisco, CA (US); Peter Ng, San Francisco, CA (US); Yuhki Brent Yamashita, San Francisco, CA (US); Siddharth Kar, San Francisco, CA (US); Nikhil Goel, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 727 days.

(21) Appl. No.: 15/228,732

(22) Filed: Aug. 4, 2016

(65) Prior Publication Data

US 2017/0169535 A1   Jun. 15, 2017

Related U.S. Application Data

(60) Provisional application No. 62/265,747, filed on Dec. 10, 2015.

(51) Int. Cl.
| | |
|---|---|
| G06Q 50/30 | (2012.01) |
| G06Q 10/06 | (2012.01) |
| G08G 1/00 | (2006.01) |

(52) U.S. Cl.
CPC ....... *G06Q 50/30* (2013.01); *G06Q 10/06311* (2013.01); *G08G 1/202* (2013.01)

(58) Field of Classification Search
CPC ... G06Q 50/30; G06Q 10/06311; G08G 1/202
See application file for complete search history.

(56) References Cited

U.S. PATENT DOCUMENTS

| 5,557,522 A | 9/1996 | Nakayama |
| 5,948,040 A | 9/1999 | DeLorme |

(Continued)

FOREIGN PATENT DOCUMENTS

| CN | 104575072 | 4/2015 |
| CN | 104931063 | 9/2015 |

(Continued)

OTHER PUBLICATIONS

Win Steps, Steps Conversions, dated Oct. 2013 https://web.archive.org/web/20131021085100/https://www.uwyo.edu/wintherockies_edur/win%20steps/coordinator%20info/step%20conversions.pdf (Year: 2013).*

(Continued)

*Primary Examiner* — Rupangini Singh
(74) *Attorney, Agent, or Firm* — Mahamedi IP Law LLP

(57) ABSTRACT

A travel coordination system coordinates travel between a client and a provider to a destination. The client and provider meet at a pickup location and the provider transports the client (or an item or object from the client) to the destination. The travel coordination system automatically suggests a pickup location for the trip by determining location data points corresponding to prior trips of clients. Location data points near the client's location are determined by distance or by region and scored to determine a pickup location that improves the estimated pickup time and/or estimated time to arrive at the destination.

15 Claims, 11 Drawing Sheets

(56) References Cited

U.S. PATENT DOCUMENTS

| | | | |
|---|---|---|---|
| 6,058,339 | A | 5/2000 | Takiguchi |
| 6,233,517 | B1 | 5/2001 | Froeberg |
| 6,321,158 | B1 | 11/2001 | DeLorme |
| 7,263,437 | B2 | 8/2007 | Hirose |
| 7,822,426 | B1 | 10/2010 | Wuersch |
| 8,005,488 | B2 | 8/2011 | Staffaroni |
| 8,565,789 | B2 | 10/2013 | Staffaroni |
| 9,075,136 | B1 | 7/2015 | Joao |
| 9,158,414 | B1 | 10/2015 | Gluzberg |
| 9,452,785 | B2 | 9/2016 | Tsuneyama et al. |
| 9,547,307 | B1 | 1/2017 | Cullinane |
| 9,562,785 | B1 | 2/2017 | Racah |
| 9,599,477 | B1 | 3/2017 | Aula |
| 9,613,386 | B1 | 4/2017 | Arden |
| 9,631,933 | B1 | 4/2017 | Aula |
| 9,715,233 | B1 | 6/2017 | Mandeville-Clark |
| 9,702,714 | B2 | 7/2017 | Botea |
| 9,733,096 | B2 | 8/2017 | Colijn |
| 2004/0249818 | A1 | 12/2004 | Isaac |
| 2006/0235739 | A1 | 10/2006 | Levis |
| 2007/0150375 | A1 | 6/2007 | Yang |
| 2007/0233373 | A1 | 10/2007 | Choi |
| 2008/0275645 | A1 | 11/2008 | Hoshino |
| 2008/0277183 | A1 | 11/2008 | Huang |
| 2009/0156241 | A1 | 6/2009 | Staffaroni |
| 2009/0216600 | A1 | 8/2009 | Hill |
| 2009/0326991 | A1 | 12/2009 | Wei |
| 2011/0320232 | A1 | 12/2011 | Staffaroni |
| 2012/0004840 | A1 | 1/2012 | Lee |
| 2012/0130627 | A1 | 5/2012 | Islam |
| 2013/0073327 | A1 | 3/2013 | Edelberg |
| 2013/0132246 | A1 | 4/2013 | Amin |
| 2013/0132140 | A1* | 5/2013 | Amin ............... G06Q 10/02 705/7.13 |
| 2014/0011522 | A1 | 1/2014 | Lin |
| 2014/0129135 | A1 | 5/2014 | Holden |
| 2014/0365250 | A1 | 12/2014 | Ikeda |
| 2015/0006072 | A1 | 1/2015 | Goldberg |
| 2015/0081362 | A1 | 3/2015 | Chadwick |
| 2015/0143275 | A1 | 5/2015 | Lee |
| 2015/0161564 | A1 | 6/2015 | Sweeney |
| 2015/0219464 | A1* | 8/2015 | Beaurepaire ....... G01C 21/3438 701/538 |
| 2015/0228192 | A1 | 8/2015 | Kawamoto |
| 2015/0248689 | A1 | 9/2015 | Paul |
| 2015/0254581 | A1* | 9/2015 | Brahme ............. G06Q 10/02 705/5 |
| 2015/0302342 | A1 | 10/2015 | Yeh |
| 2015/0339923 | A1 | 11/2015 | TomTom |
| 2015/0339928 | A1 | 11/2015 | Ramanujam |
| 2016/0027306 | A1* | 1/2016 | Lambert ............. G08G 1/123 701/117 |
| 2016/0034828 | A1 | 2/2016 | Sarawgi |
| 2016/0034845 | A1 | 2/2016 | Hiyama |
| 2016/0048804 | A1 | 2/2016 | Paul |
| 2016/0055769 | A1 | 2/2016 | Angelescu |
| 2016/0301698 | A1 | 10/2016 | Katara |
| 2016/0320198 | A1 | 11/2016 | Liu |
| 2016/0321771 | A1* | 11/2016 | Liu ................. G06Q 50/30 |
| 2016/0370194 | A1* | 12/2016 | Colijn ............. G01C 21/343 |
| 2017/0052034 | A1* | 2/2017 | Magazinik ........ G01C 21/3438 |
| 2017/0059347 | A1* | 3/2017 | Flier ............... G01C 21/3605 |
| 2017/0103490 | A1 | 4/2017 | Haparnas |
| 2017/0153714 | A1 | 6/2017 | Gao |
| 2017/0160092 | A1 | 6/2017 | Botea |
| 2017/0169366 | A1 | 6/2017 | Klein |
| 2017/0193404 | A1 | 7/2017 | Yoo |
| 2017/0213308 | A1 | 7/2017 | Wellborn |
| 2017/0277191 | A1 | 9/2017 | Fairfield |
| 2017/0286884 | A1 | 10/2017 | Shoval |
| 2017/0293950 | A1 | 10/2017 | Rathod |
| 2017/0314948 | A1 | 11/2017 | Racah |
| 2017/0365030 | A1 | 12/2017 | Shoham |
| 2018/0156623 | A1 | 6/2018 | West |
| 2018/0202820 | A1 | 7/2018 | Yu |
| 2018/0202821 | A1 | 7/2018 | Yu |
| 2018/0342035 | A1 | 11/2018 | Sweeney |
| 2018/0356239 | A1 | 12/2018 | Marco |
| 2018/0374032 | A1 | 12/2018 | Pan |
| 2019/0137288 | A1 | 5/2019 | Rahematpura |
| 2019/0306258 | A1 | 10/2019 | Yamashita |

FOREIGN PATENT DOCUMENTS

| | | |
|---|---|---|
| JP | 2010-208195 | 8/1998 |
| JP | 3934985 | 6/2007 |
| JP | 2012-73995 | 4/2012 |
| JP | 2004-073639 | 5/2015 |
| WO | WO-2002006994 | 1/2002 |
| WO | WO 2014/074407 | 5/2014 |
| WO | WO2014106617 | 7/2014 |

OTHER PUBLICATIONS

Dominik Pelzer et al., "A Partition-Based Match Making Algorithm for Dynamic Ridesharing", IEEE Transactions on Intelligent Transportation Systems, vol. 16, Issue: 5, pp. 2587-2596 (Year: 2015).*
EESR in EP 15830335.4 dated Nov. 29, 2017.
Written Opinion in SG 11201700671P dated Oct. 13, 2017.
ISR and Written Opinion in PCT/US2018/013583 dated Apr. 20, 2018.
International Search Report in PCT/US2015/043654 dated Nov. 26, 2015.
IPRP in PCT/US2015/043654 dated Feb. 16, 2017.
International Search Report in PCT/US2016/066030 dated Feb. 28, 2017.
ISR and Written Opinion in PCT/US2018/059230 dated Jan. 2, 2019.
Andrew J. Hawkins, Lyft is now suggesting more convenient pickup locations, because a little walking won't kill you. Jun. 26, 2017 The Verge (www.theverge.com).
IPRP in PCT/US2016/066030 dated Jun. 21, 2018.
2nd Written Opinion in SG 11201700671P dated Aug. 29, 2018.
ESER in EP 16874019.9 dated Aug. 22, 2018.
ISR dated Oct. 3, 2018 in PCT/US2018/039830.
Borison, Rebecca, "Uber Brings its SUV Fleet to NYC", Jul. 30, 2014, Business Insider, p. 1.
Hilen, Brittany, Uber and Google bring WIFI to cars in Philadelphia, Slashgear, dated Jul. 24, 2014, p. 1, https://web.archive.org/web/20140724201314/http://www.slashgear.com/uber-and-google-bring-wifi-to-cars-in-philadelphia-22338326.
Jain, "Contextual Adaptive User Interface for Android Devices", Annual IEEE India Conference (INDICON), IEEE, pp. 1-4 (2013).
Office Action in EP 15830335.4 dated Mar. 21, 2019.
Office Action in JP 2017-505856 dated Feb. 6, 2019.
Mark H. Walker, "Microsoft Office Visio 2003 Official Manual", Initial Pressing, Nikkei BP Soft Press, Apr. 4, 2005, First Edition, pp. 423-425.

* cited by examiner

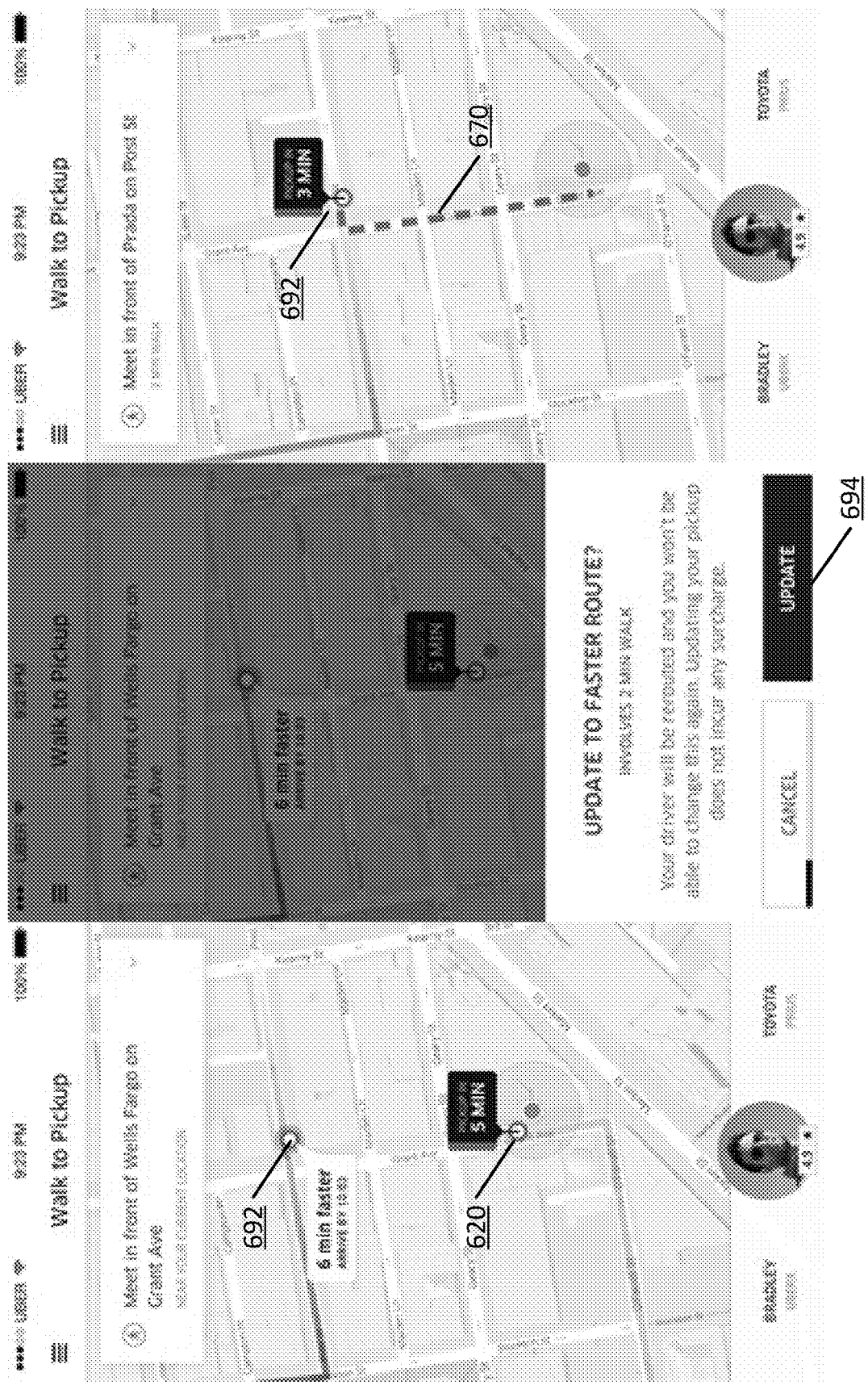

SUGGESTED PICKUP LOCATION FOR RIDE SERVICES

CROSS REFERENCE TO RELATED APPLICATIONS

This application claims the benefit of U.S. Provisional Application No. 62/265,747, filed Dec. 10, 2015, which is incorporated by reference in its entirety.

BACKGROUND

A travel coordination system receives requests from clients (e.g., "riders") for transportation to a destination. The travel coordination system identifies a provider for the trip and directs the provider to pick up the rider. Typically, the rider designates the rider's location as the location for the provider to pick up the rider and begin the trip. This manual determination of pickup location can often yield pickup locations that are not optimized for actual road conditions, or may delay pick up time or total trip time due to poorly-chosen pickup locations by users. Users may also need to contact the provider to adjust a pick up location, for example to cross the street, or because the initially-proposed pickup location is not suitable for the pickup. In addition, the manual selection of a pickup location can add an additional step in the user's request for trip services.

SUMMARY

A travel coordination system automatically selects pickup locations for a trip to efficiently facilitate transport or delivery services for requesting users. For example, when an individual user or client of a network service makes a request for a transport service, the system can determine a pickup location for the transport service to reduce the amount of distance traveled by a provider, reduce the amount of time spent traveling by a provider, reduce the amount of time the client has to wait, and/or improve the overall efficiency of the network service. The system can instruct both a selected provider and the client to travel to the selected pickup location.

In some embodiments, the travel coordination system associates eligible pickup locations with individual regions, which may represent city blocks, buildings, individual portions of buildings, or other geographic areas. In these embodiments, the travel coordination system determines a region in which the user is located and selects a pickup location from the region associated with the user. In addition, the regions may be hierarchically organized, such as a portion of a building within a building, and the travel coordination system may consider one or more regions in the hierarchy that include the user's location for considering eligible pickup locations. For example, the travel coordination system may initially evaluate pickup locations associated with the smallest-size region, and evaluate additional regions in the hierarchy when those pickup regions do not provide a favorable trip time or when other conditions occur.

In addition, while a provider is en route (e.g., traveling) to an initially-selected pick up location, the travel coordination system may evaluate alternative eligible pickup locations and suggest an alternate pickup location before the pickup occurs. Information about the alternate pickup location and associated information can be provided to the rider's device, so as to inform the rider about the option to change pickup locations and to educate the rider about the potential results of changing pickup locations.

BRIEF DESCRIPTION OF THE DRAWINGS

FIGS. 6A-6H illustrate example user interfaces of a client application that runs on a client device to coordinate a trip and view pickup locations.

DETAILED DESCRIPTION

Figure 1:
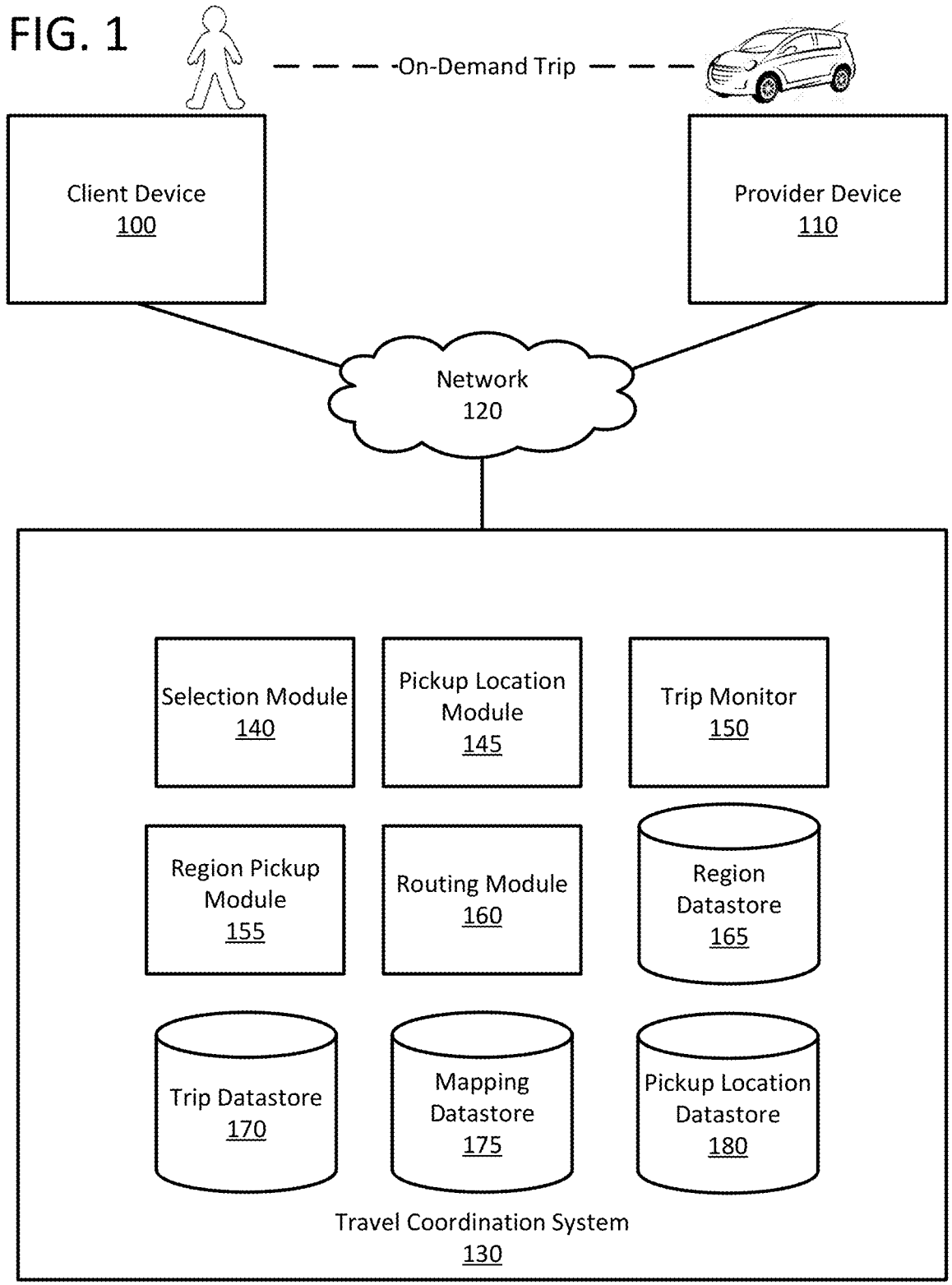
FIG. 1 illustrates an example travel coordination system 130 for suggesting one or more pickup locations to a client.

FIG. 1 illustrates an example travel coordination system 130 for suggesting one or more pickup locations to a client. The travel coordination system 130 coordinates delivery of a good/item or travel for a client operating a client device 100 by a travel provider (from a pool of travel providers) operating a provider device 110. The client can operate an application on the client device 100 to make a request for a delivery or transport service ("a trip"). According to some examples, as opposed to specifying an exact pickup location, the client can specify a pickup region (e.g., defined by a predetermined radius from a specified location inputted by the user or corresponding to the current location of the client device 100) and/or a destination location for the trip. In another embodiment, the client specifies the client's current location as part of a request for a trip, and the travel coordination system 130 designates a pickup location for the trip. The application can generate and transmit a trip request to the travel coordination system 130 over the network(s) 120.

The travel coordination system 130 identifies a provider to provide the on-demand trip for the client. Typically, to provide a trip, a selected provider operates a car or other vehicle (e.g., bus, boat, etc.) and picks the client up from the pickup location of the client and takes the client to the destination. There may be many providers available to provide the trip, each operating a provider device 110, and each of whom may be located at different distances from the client or a specified location provided by the client. As described herein, an amount of time associated with a trip can include an amount of time for a provider to reach the pickup location of the client, and an amount of time for the provider to reach the destination location of the client. The time for a provider to reach the pickup location of the client is termed the estimated time of arrival, or ETA, and the time to reach the destination location from the pickup location is termed the estimated destination time, or ETD. The total time for a trip can be represented by the sum of the ETA and ETD. In some examples, the total time for a trip is the sum of the ETA, the ETD, and a predefined amount of time to represent the time it takes for the client to actually find and enter the vehicle and/or a predefined amount of time to represent the time it takes for the client to exit the vehicle. To reduce the total time for a trip and improve pickup of the client by the provider, the travel coordination system 130 may suggest a pickup location for the client, rather than using the client's current location or specified pickup location (e.g., a location corresponding to an address or a location indicated by a graphic pin on a map specified by the client).

The client device 100 and provider device 110 are electronic (e.g., computing) devices that can communicate with the travel coordination system 130. These devices may be portable or handheld devices that communicate with the travel coordination system 130 via a network 120. Typical devices include smart phones, portable data devices (PDAs), laptops, and other such devices. Each client device 100 and provider device 110 can store and run a respective client application that can communicate with the travel coordination system 130. For example, the client device 100 may execute an application that provides a user interface to enable the client to request a trip. In other examples, the client device 100 may be a fixed station for coordinating travel for clients.

The client device 100 can also include a location detection or positioning system, such as a global positioning satellite (GPS) sensor or receiver, or other method for determining the location of the client device 100. In some examples, when the client device 100 requests a trip from the travel coordination system 130, it provides a location of the client device 100 by communicating with the GPS sensor. As further described with respect to FIGS. 6A-6H, the client device 100 provides a user interface to the client for selecting a pickup location or region, inputting or selecting a destination location, viewing potential pickup locations, and/or viewing directions to the pickup location. Similarly, the provider device 110 may display an interface to a provider to provide invitations for providing trips and/or instructions to the provider for the trip. The provider device 110 may display directions to the pickup location and directions from the pickup location to the destination location. In addition, the provider may indicate to the travel coordination system 130 via the provider device 110 whether the provider is available or unavailable to provide on-demand trips at a given point in time.

According to some examples, the client may indicate to the travel coordination system 130 that the client is willing to travel (e.g., walk) to a location suggested by the travel coordination system 130. The client may indicate the client's willingness to walk a maximum distance by opting in or agreeing to an option via a user interface of the client application (e.g., before, after, or during trip request). As an addition or an alternative, the client may specify the pickup location, before or after a suggested location is provided by the travel coordination system 130. Still further, in another example, after a trip is requested, the client may also move to another location, such that the actual pickup location for a trip differs from the suggested location or the pickup location selected by the client. When the trip begins (i.e., the client enters the provider's vehicle and/or the provider begins the trip by providing input in the provider's application), the client device 100 or provider device 110 may report the actual pickup location of the beginning of the trip to the travel coordination system 130.

In addition, the client of the client device 100 may indicate to the travel coordination system 130 that the client is willing to "pool" with another client. In some examples, the client may select a "pool" vehicle type or service type on the client application when making the trip request. When pooling with another client, the provider may pick up more than one client from one area who are both headed to a different destinations. As further described below, the travel coordination system 130 may coordinate the pickup location for a second client in a trip (i.e., to join a first client) based on the trip already in progress for the first client.

To determine a pickup location for the client, the travel coordination system 130 identifies eligible pickup locations for the trip based on a region specified by the client (and/or based on a location specified by the client), and scores the eligible pickup locations to suggest a location to the client.

According to various examples, the travel coordination system 130 includes various modules and data stores for providing trip coordination between clients and providers. In this example, the travel coordination system 130 includes a selection module 140, a pickup location module 145, a trip monitor 150, region pickup module 155, a routing module 160, a region datastore 165, a trip datastore 170, a mapping datastore 175, and a pickup location datastore 180. In various embodiments, more or fewer modules and datastores may be used by the travel coordination system, and certain elements may be provided by other external systems in communication with the travel coordination system 130. For example, the mapping datastore 175 and routing module 160 in some embodiments are provided by an external mapping service, rather than as a part of the travel coordination system 130.

The trip datastore 170 maintains a record of each completed and in-progress trip coordinated by the travel coordination system 130. The record of each trip may indicate the client, provider, the pickup location, the destination location, the vehicle type, the route traveled, the duration of time, the fare, etc., for the trip. As applicable, the trip datastore 170 may include any suggested pickup location, pickup locations designated by the client, and the actual pickup location of the trip.

The mapping datastore 175 maintains data describing data relating to navigation and mapping. For example, the mapping datastore 175 may include locations, points of interest, roads and other mapping detail. In some embodiments, the mapping datastore 175 may also include short-term data reflecting short-term effects on routing and navigation, such as construction, traffic, weather, or events. This data may also be maintained by a separate system or datastore.

In some examples, the pickup location datastore 180 stores predetermined location data points corresponding to locations that may be selected for suggested pickup locations. The determination of these predetermined location data points is described below, and may reflect where previous trip pickup locations and trip destination locations have (and have not) occurred in a given region. For example, one predetermined location data point for a city (which may have many predetermined location data points) can be a location where a large number of pickups have occurred on a street or street corner that is frequented by people and/or vehicles. The predetermined location data points may be used to determine eligible pickup locations for a trip, and may be determined, as described below, by the pickup location module 145.

In some examples, the travel coordination system 130 includes a region datastore 165. The region datastore 165 maintains a set of regions and a set of predetermined location data points for each region. Each region defines a geographical area, such that a given location can be determined as within one or more regions. Each predetermined location data point may also be associated with more than one region. The regions may overlap, and may be hierarchically-arranged (i.e., one region may be a geographical subset of another region). As examples, one region may be the city of New York. Several further regions may be included within the City of New York region, such as a region corresponding to the "upper east side" or "Rockefeller Center." Regions may also include smaller geographic areas, such as a city block, a building, or a portion of or lot of a building. Similar, a park may be designated as a region, and different portions of the park may also be designated as regions hierarchically belonging to the park. The regions and associated predetermined data points may be determined by the region pickup module 155 as described below. Each region may also be associated with one or more addresses (though typically defines only one contiguous geographic area), and may be associated with structured data about the region that may include additional details of the region, such as a name of the region ("central park"). In some instances, an associated region is identified for a trip request, and the pickup location is selected from among the predetermined location data points for that region.

When a request is received by the travel coordination system 130 from a client device 100, the travel coordination system 130 can determine the client identifier, the vehicle or service type, the user-specified pickup location or current location of the client device 100 or pickup region (referred to herein as "specified pickup location"), and/or the destination location. The selection module 140 coordinates the selection of providers for trip requests by evaluating and selecting a provider for the trip.

According to an example, when the travel coordination system 130 receives a request for a trip, the selection module 140 identifies the specified pickup location, and determines a set or pool of providers that are within a predetermined distance or predetermined ETA away from the specified pickup location and are capable of being able to provide the trip for the client (e.g., has an availability state). The travel coordination system 130 can periodically receive locations and state information of providers from the providers' applications running on the provider devices 120 and store/update the information in a provider database (not illustrated in FIG. 1 for purpose of simplicity). The selection module 140 can access the provider database to determine the pool of providers that are located near the specified pickup location.

Still further, in one example, a pickup location module 145 determines eligible pickup locations from the mapping datastore 175 or the pickup location datastore 180 based on the location of the client or the specified pickup location. The eligible pickup locations can correspond to predetermined location data points near the specified pickup location that are eligible to be selected as the suggested pickup location for the trip. For example, the pickup location module 145 can determine eligible pickup locations from predetermined location data points that are within a predetermined distance or predetermined estimated travel time by walking (e.g., at a standard rate) from the specified pickup location. In another example, the travel coordination system 130 can transmit data of the eligible pickup locations to the client device 100 so that graphic indicators corresponding to the eligible pickup locations may be displayed in a user interface.

The pickup location module 145 can determine and suggest a pickup location for the client for a trip. To determine the pickup location, the pickup location module 145 determines predetermined location data points, and identifies eligible pickup locations from the predetermined location data points. The predetermined location data points may be stored in the pickup location datastore 180. The pickup location module 145 can use historical trip information from the trip datastore 160 to determine the location data points. The historical trip information reflects the locations that users actually used for trips, and therefore may reflect favorable places for trip pickup, without requiring clients to specifically designate areas as good or bad pickup areas. In some examples, rather than predetermining the location data points, the location data points may be determined when a trip is requested by a client. In addition, a pickup location may be determined after a provider is en route to the client, and may suggest a modification to an initial pickup location.

The pickup location module 145 determines eligible pickup locations from the predetermined location data points, and then scores the eligible pickup locations to determine which, if any, to suggest to the user. The scoring may be based on a cost for a provider to reach the eligible pickup location and the cost for the provider to reach the destination from the eligible pickup location, so that the total travel time for a provider (and thus the trip) may be reduced or minimized. Various processes used by the pickup location module 145 for suggesting a pickup location is more fully discussed with respect to FIGS. 3-5.

The trip monitor 150 monitors trips that are assigned to providers and/or are in-progress (e.g., not yet complete). For example, the trip monitor 150 may receive information (e.g., periodically receive status and/or location information) from provider devices 110 while the provider travels to the destination for a trip. In particular, the trip monitor 150 may maintain a list of in-progress trips that are eligible for pooling with new client trip requests. The trip monitor 150 thus provides information to the selection module 140 or the pickup location module 145 for selecting an in-progress trip as a provider for a new trip. When a trip concludes, the trip monitor 150 notifies the selection module 140 to determine the price of the trip and bill the client, and the trip monitor 150 stores the resulting trip details in the trip datastore 160.

The region pickup module 155 identifies a set of regions and identifies associations of location data points with each region. For example, the region pickup module 155 can determine, based on the specified pickup location information (e.g., a lat/long coordinate of the pin, an address, or a structured object), one or more regions applicable to that pickup location. Each location data point associated with a region designates a location data point from which a pickup may occur from that region. As noted above, regions define a geographical area, such as city block, building, or portion of a building. Each region may be provided by mapping data from the mapping datastore 175 or may be retrieved from external data sources. A region may also be determined based on maps or other information provided by mapping services or building owners, who may provide layout and other configuration information for a building itself.

The region pickup module 155 may also automatically determine regions based on the location and orientation of roads and buildings. For example, the region pickup module 155 may automatically identify a region for each city block or area enclosed by roads. In addition, the region pickup module 155 may automatically identify a region for each building, and optionally associate that building with the city block in which the building is located. Each city block may also automatically be associated with a region for each sidewalk between roads on the city block. Regions may also be automatically determined based on the location of clients that request rides. For example, the trip datastore 170 may retain the location of a client when the client requested a trip from the travel coordination system, as well as the location that a client was picked up to begin the trip. The locations of clients when requesting trips may be clustered to identify regions associated with each cluster of users. Such clusters may represent distinct geographic areas of a building, such as a front or back lobby, or different stores within a mall. The locations of clients may be clustered at varying levels of granularity (e.g., an increasing number of clusters) to generate a hierarchy of regions. For example, locations in a city block may be initially clustered to identify regions that may correspond to sidewalks and buildings within the city block, and locations within the buildings may be clustered to identify portions of the building from which users request trips.

Figure 2:
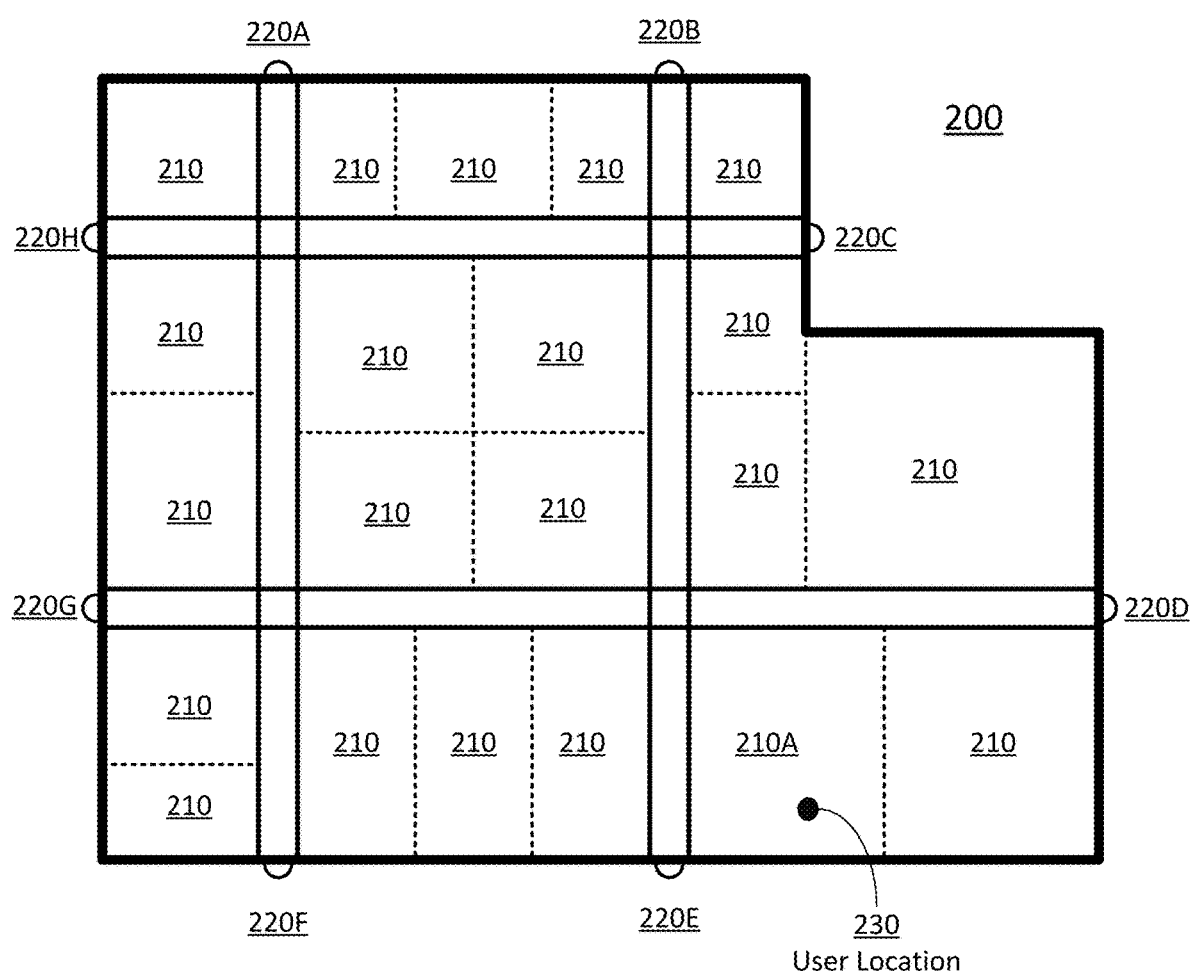
FIG. 2 shows example regions and associated location data points for eligible pickup locations.

For example, FIG. 2 shows example regions and associated location data points for eligible pickup locations. In this example, a building 200 is identified as one region with a plurality of associated location data points 220A-220H. In this example, the building 200 is a large retail center, such as a mall, with several hallways and exits. Each exit to the building 200 may be identified as a location data point 220 that may be recommended as a pickup location for a trip. That is, when users initiate a pickup from the region 200, users may be picked up from any of the location data points 220. Each region 210 represents another region located within the region 200. For example, these regions may represent individual stores or separations of the building region 200. The regions 210 may be provided by a mapping service or by the owner or manager of the building associated with region 200, or the regions may be automatically determined by the region pickup module 155. For convenience, region 200 is referred to as building region 200, while regions 210 are referred to as store region 210, though these concepts may apply to any relationship between hierarchical While the building region 200 may be associated with each of the location data points 220A-H, each store region 210 may be associated with a different set of location data points to serve as pickup locations from that store region 210. For example, store region 210A may be associated with location data points 220D and 220E. To determine associations between regions and location data points, the region pickup module 155 identifies trips that originate in each region and identifies which location data points are actually used by clients when beginning trips from that region. Outlier location data points may be excluded, or those that are not used at least a threshold quantity or percentage of trips. Accordingly, while the building region 200 may be associated with many location data points 220A-H at the exits of the building, the store region 210A may only be associated with regions 220D and 220E when users from this region only use these location data points from this region. As discussed further below, these regions may be used to more accurately suggest pickup locations from each region, while also permitting consideration of additional pickup locations from a larger region (i.e., of which the current region is a subset) under certain conditions. For example, a user located at location 230 (or alternatively, a pickup location specified by the user at location 230) may be identified as both within store region 210A and in building region 200. The pickup location module 145 may consider the location data points associated with store region 210A initially, and secondarily consider the location data points associated with the building region 200 when the location data points associated with store region 210A do not score well for the trip.

Returning to FIG. 1, the routing module 160 optimizes a route from a pickup location to the destination for a trip. The routing module 160 accesses map data at mapping datastore 175 as well as short-term data to predict travel speed along the route and select a route for the trip. The routing module 160 may use any suitable routing algorithm, such as Djikstra's algorithm for calculating the route between the pickup and destination. The routing module 160 may also calculate the route from a provider to the pickup location. When the routing module 160 calculates the route, the routing module 160 may also calculate a distance or amount of time that the route will take. The routing module 160 may also access event and other short-term data from the mapping datastore 165 to account for variations in routing that may occur due to this short-term data. The routing module 160 provides the route and the estimated time to the module requesting the route, such as the selection module 140 or the pickup location module 145.

Figure 3:
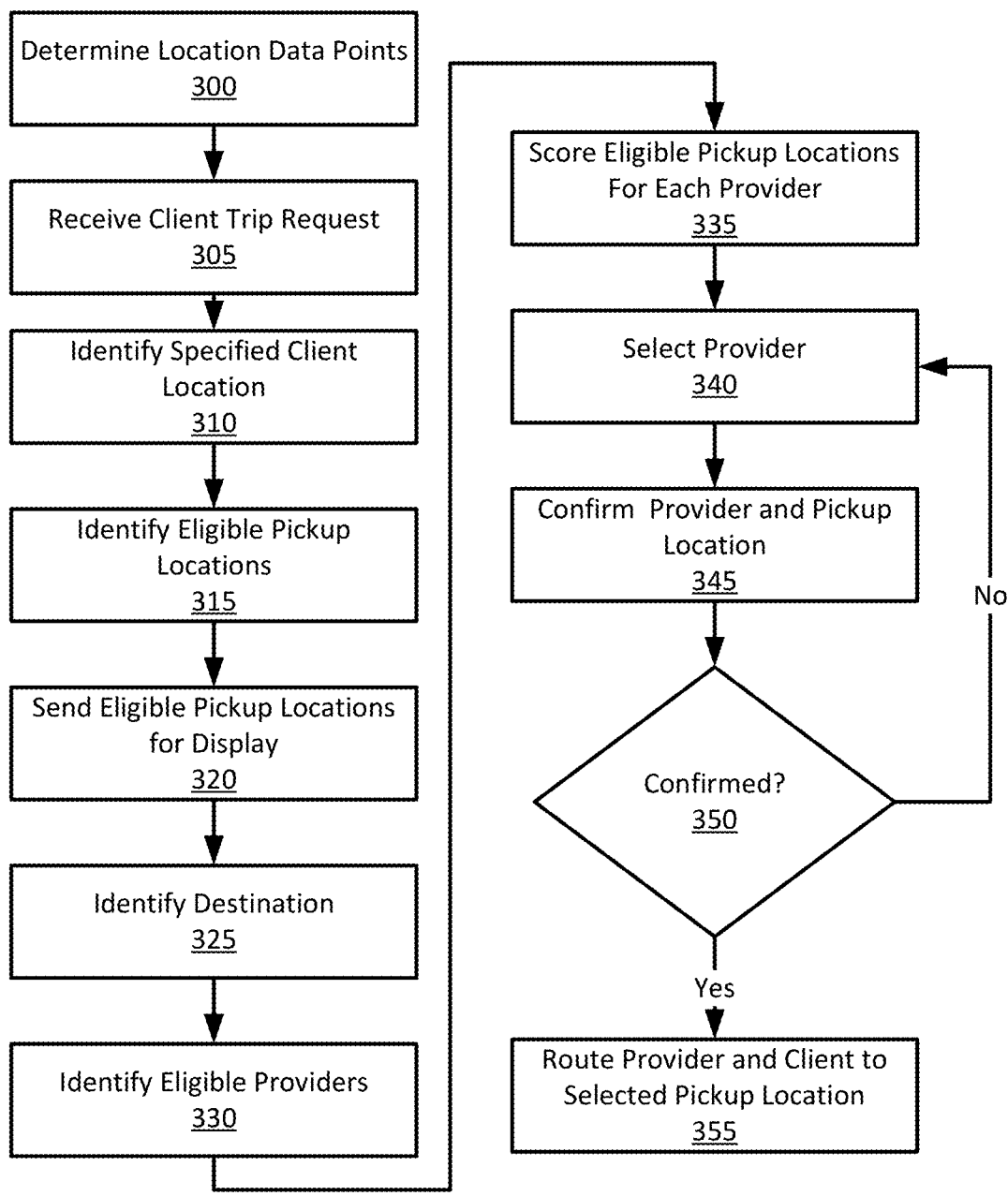
FIG. 3 shows an example method for selecting a suggested pickup location for a trip.

FIG. 3 shows an example method for selecting a suggested pickup location for a trip. This method may be performed, for example, by the pickup location module 145, though certain steps may be performed by additional or alternative modules or systems. In the example of FIG. 3, the travel coordination system 130 identifies eligible pickup locations for a user's specified location prior to identifying a destination for the trip. This permits possible pickup locations to be displayed to a user as the user interacts with the user interface to select a destination. After receiving the destination, a pickup location is selected from the eligible pickup locations while a provider is selected for the trip. In other embodiments, the user may provide the destination prior to receiving an indication of the eligible pickup locations, and in other examples the user may be automatically directed to a pickup location selected by the travel coordination system.

In this example method, the travel coordination system 130 determines 300 location data points prior to receiving a client trip request (i.e., the travel coordination system 130 determines possible locations for suggesting a pickup prior to receiving individual client trip requests). These predetermined location data points may be stored in the pickup location datastore 180. To determine the location data points, in one example the location data points include any intersection between roads, and may include corners of each intersection as a location data point (i.e., as a possible pickup location to select for a trip). In another example, the location data points may be selected based on the pickup locations of previous trips. To determine these pickup locations for prior trips, prior trip information is retrieved from the trip datastore 170. These pickup locations may include any actual pickup location (i.e., the location at which a client was actually picked up), or pickup locations specified by a client, which may differ from the actual pickup location for a trip. In one embodiment, the location data points do not consider trips from the trip datastore 160 that had a pickup location suggested by the travel coordination system 130, to permit actual user pickups to continue to affect the suggested pickups. From the pickup locations in the trip datastore 160, the pickup location module 145 may group the pickup locations into clusters based on distance from one another, and from within one cluster select one location as a location data point. To select this location data point from within a cluster of locations, the pickup location module 145 identifies a most frequently used pickup location or identifies a "center of mass" within the cluster. The "center of mass" may be determined by averaging the locations of the pickups within the cluster. Additional or alternative methods of selecting a location data point from within a region may also be used. In another example, the eligible pickup locations may include any location along a street that is not excluded as indicated below. These methods may also be used in combination with one another, for example to include each intersection as well as eligible pickup locations from a center-of-mass for past pickups for a region. After determining these location data points, they may be stored in the pickup location datastore 180 for association with various regions in the region datastore 165. The determination of location data points 300 may also be performed asynchronously from any individual trip request, and updated at various times, such as each day, week, or month.

From each of these methods, the pickup location module 145 may also exclude as a location data point those locations from which no pickup has occurred. These locations may indicate undesirable or impossible locations for a pickup, though those locations may be at an intersection or otherwise appear accessible from the mapping data at mapping datastore 165. Since no trips actually originate from that location, these locations may represent poor locations for a pickup and be excluded as pickup locations.

Next, the travel coordination system 130 receives 305 a client trip request for a client and identifies 210 the specified location of the client requesting the trip. The client trip request 305 may provide a specified pickup location from the client. In some examples, the client trip request also includes the destination, the user identifier, a device identifier, and/or other settings for the trip, such as whether the client is willing to pool with other clients for a trip, or a vehicle type, etc. The travel coordination system 130 identifies 310 the specified location of the trip from the client device 100. The specified location may be the location of the client device, or may be another location specified by the client. Next, the travel coordination system 130 then identifies 315 eligible pickup locations for the trip. The eligible pickup locations 315 are those locations among the location data points that may be a pickup location for this particular trip. The eligible pickup locations may be limited by a threshold distance or walking time from the specified client location. For example, the eligible pickup locations may only be selected from within 150 meters of the specified client current location. This threshold may be set by an operator of the travel coordination system 130, or may be configurable by a client. Within this threshold distance, the eligible pickup locations may be selected from the location data points, for example by selecting all location data points within the threshold distance.

After identifying 315 eligible pickup locations, the eligible locations may also be reduced to a maximum number of eligible locations, for example five or ten. In some examples, such as when the user does not select the pickup location (e.g., a specific pickup location is selected by the travel coordination system 130), the eligible locations are not reduced and all eligible locations may be subsequently scored 335. To select which eligible locations to include after reducing to the maximum number, heuristics or other criteria may be applied to eliminate eligible pickup locations that are within a specified distance of one another, for example to remove pickup locations within ten meters of another pickup location, though other threshold distances may be used.

In this example, the received 305 client trip request did not provide the destination for the trip, such that the eligible pickup locations are sent 320 to the client device 100 for display to the user as the user enters a destination for the trip. The eligible pickup locations may be sent 320 even if the client trip request specified the destination, so that the eligible pickup locations can be displayed as the travel coordination system 130 determines a provider and suggested pickup location for the trip. The eligible pickup locations may be displayed on a map user interface within a radius reflecting the maximum distance of an eligible pickup location, as further shown in FIGS. 6A-6E. Alternatively, in some examples, the travel coordination system 130 does not send eligible pickup locations to the client device 100. In one example, the client application running on the client device 100 can be preprogrammed to display simulated or randomly-generated pickup locations to indicate the possibility of other eligible pickup locations to the user.

When the user enters the trip destination, the trip destination is sent to the travel coordination system 130, which identifies 325 the destination. After identifying the destination, the travel coordination system 130 identifies 330 a set of providers eligible to provide the trip for the user. The set of providers may be identified from the providers within a threshold distance of the user, and can include providers that indicate to the travel coordination system 130 that they are eligible for accepting trips. When the client indicates that the client is willing to pool with other clients, the set of providers may also include those providers that are already on a trip with a client that is willing to pool, or may include free providers that are willing to provide pooled trips. To select the set of providers, in one embodiment the providers nearest the client location, up to a maximum number, may be selected. Alternatively, all providers within a threshold distance may be included in the set of eligible providers. In other embodiments, when the client indicates a request to pool with another client for a trip, the selection module 140 requests eligible providers from the trip monitor 150 to identify providers on existing trips that pass within a threshold distance and within a threshold time of the client location. These providers may also be excluded if the client's destination is over a threshold distance from a destination of the existing trip for the provider.

In various configurations, the pickup location or provider may be selected first, and in other cases the pickup locations and providers are jointly evaluated to determine the pickup location-provider combination that provides the lowest cost from among the set of possible providers. In alternate embodiments, rather than selecting and evaluating a set of eligible providers, a single provider may be selected, and a pickup location selected for that provider as indicated below. To compare multiple providers, the optimal pickup location for each provider may be identified, and each provider-optimal pickup location scored to select the best score (e.g., with the shortest trip time).

To identify a suggested pickup location for the trip, the eligible pickup locations for are scored 335 for each provider. To score 335 the eligible pickup locations, the pickup location module 145 determines the total cost of travel for each pickup location. The cost of travel for a pickup location is evaluated based on the estimated time to reach the pickup location from the provider's current location (ETA), and the estimated time to reach the destination from the pickup location (ETD). The cost of travel may be determined by the routing module 155. These travel costs may account for the direction of travel of the provider at the time of the request, traffic conditions, and other routing conditions.

To score a provider with an existing client (e.g., a pooled trip), in addition to determining the ETA and the ETD for the eligible pickup location, the cost to reach the destination for the existing client is considered and the expected increase in cost from the additional pickup at the requesting client's location is determined and added to the cost for the eligible pickup location.

In examples in which the pickup location is selected first, the eligible pickup locations may be scored based on the ETD from each eligible pickup location to the destination. After selection of a pickup location, the providers may subsequently be scored based on the ETA to the selected pickup location. This may be used, for example, to permit a client to view pickup location scores and select a pickup location prior to selection of a provider.

In addition to the constraints on selecting an eligible pickup location as indicated above, an eligible pickup location may also be excluded if the estimated time for the client to walk to the pickup location exceeds the time for the provider's ETA, to prevent the provider from waiting at the pickup location. In addition, if the cost improvement relative to the current location of the client is very low (e.g., 1-2 minutes) or relative to the specified pickup location, the eligible pickup location may also be excluded in some embodiments, such that the client's current location or specified pickup location may be used.

In some circumstances, evaluating the cost of the eligible pickup locations may be inefficient and costly. To improve the evaluation of eligible pickup locations, an optimization may be performed to evaluate the pickup locations. In this optimization, the pickup locations may be sampled, for example to select eligible pickup locations at least a threshold distance from one another, and perform the scoring for those pickup locations. In another example, the expected route of a provider may be calculated and the scoring function may be performed based on the pickup locations along the provider's route.

After scoring the eligible pickup locations for each provider, the lowest-cost pickup location may be determined for each provider, and the provider with the lowest cost is selected 340. After selection, in some embodiments the provider and/or client confirm 345 whether to accept the trip and/or pickup location. When the provider and pickup location are confirmed 350, a route to the selected pickup location is calculated for the client's location and the route is sent 355 to the client. Similarly, a route to the selected pickup location from the provider's location is sent 355 to the provider. After receiving the selected pickup locations, the client and provider may proceed to the selected pickup location to begin the trip. When the provider does not confirm the trip, another provider may be selected 340.

As an addition or an alternative, in some examples, the travel coordination system 130 can suggest a pickup location for the user after selecting an eligible provider to provide the service for the user. For example, the travel coordination system 130 can receive the trip request, identify the specified location provided by the user, and select a provider from a pool of eligible providers based on the proximity or estimated travel time of the individual providers to the specified location. After selecting the provider having the shortest estimated travel time or shortest distance from the specified location, for example, the travel coordination system 130 can determine the estimated speed and route of travel of the selected provider (e.g., direction and/or speed of travel, what road the selected provider is on, etc.). Based on the estimated speed and/or route of travel of the selected provider to the general region of the user, the travel coordination system 130 can determine which eligible pickup location, within a predetermined distance of the specified location of the user, is best suitable for the trip to minimize the amount of time and/or distance the provider would have to travel. The travel coordination system 130 can then provide the suggested pickup location to both the provider device 110 and the client device 100, such as described with an example of FIG. 6A-6H.

Figure 4:
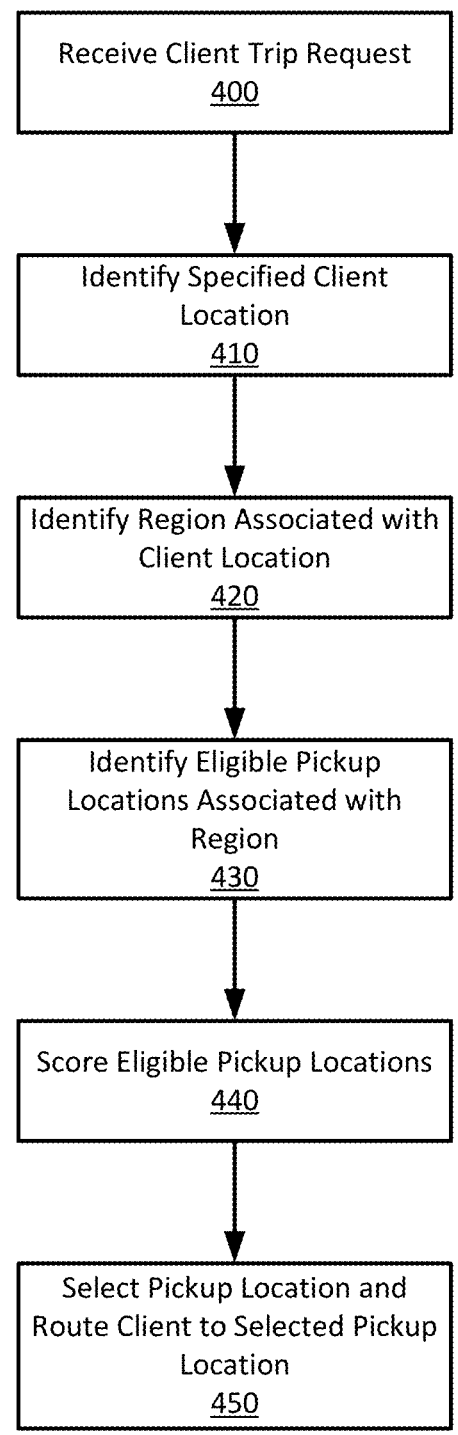
FIG. 4 illustrates an example method for selecting a pickup location using location data points associated with a region of the user.

FIG. 4 illustrates an example method for selecting a pickup location using location data points associated with a region of the user. This method may be performed by the pickup location module 145 as an alternative to the method of FIG. 3, or also be performed concurrently to the method of FIG. 3. This method may be performed concurrently, for example, to consider both eligible pickup locations within a specified distance of the user and to consider eligible pickup locations associated with the user's region. In this example, the travel coordination system 130 receives 400 a client trip request 400 as before. The trip request can include pickup location information (e.g., lat/long coordinate of the pin, an address, a structured object, etc.), destination location information, vehicle type or service type information, a user identifier, and/or the client's current location. The client's location (e.g., the pickup location or the current location, depending on implementation) may be identified in the request 410. One or more regions associated with client location are identified 420 by comparing the client location to the geographical area and/or to other data associated with the regions in region datastore 165. More than one region may be identified because the regions may overlap and certain regions may hierarchically within another region. For example, a user at user location 230 in FIG. 2 may be identified as associated with store region 210A and building region 200, as the user location 230 is within the geographical area associated with each region.

Next, eligible pickup locations are identified 430 associated with the individual identified region(s). The eligible pickup locations are identified as the location data points associated with each identified region. In some examples, rather than identifying the all location data points associated with the one or more regions, the eligible pickup locations are initially identified from one selected region. One region from the one or more regions may be selected, for example, based on its location in a region hierarchy. For example, the selected region may be the region that is hierarchically the lowest (i.e., a subset of another region) or associated with the least geographical area. In addition, a geographical center may be determined for each region, and the selected region may be the region to which the client location is closest to the geographical center. The location data points associated with the selected regions (or one or more regions) may be identified as eligible pickup locations for the trip. As described with respect to FIG. 3, these eligible pickup locations may be scored 440 in various embodiments to select a pickup location and route the client to the selected pickup location 450. These eligible pickup locations may be scored before, after, or concurrently with selection of a provider, as discussed in FIG. 3.

Prior to selecting the pickup location, the method may include selecting additional regions from the one or more regions for consideration of location data points as an eligible pickup location for the trip. In some embodiments, one or more conditions affecting the selected region cause additional regions to be considered and its associated location data points added to the identified eligible pickup locations for the trip (which then may be scored 440). These conditions may include, for example, significant changes in short-term conditions to user's location or to the identified pickup locations. Such short-term conditions may include, for example, traffic or construction in or near the region or its associated pickup locations. When the changes are above a threshold, the pickup location module 145 may consider another region identified 420 with the client's location, such as a region hierarchically broader (e.g., a larger geographical area) than the previously selected region for the eligible pickup locations. For example, for the user located at user location 230, store region 210A and building region 200 may both be identified as regions in which the client is located. The store region 210A may initially be selected for consideration of its associated location data points 220D and 220E for an eligible trip. After scoring 440 the eligible pickup locations, the scoring 440 may indicate a high ETA for the provider due to short term conditions in arriving at location data points 220D and 220E. The building region 200 may then be selected for possible pickup locations to determine whether the scoring for additional eligible pickup locations improve the score, such as for location data points 220A-C and 220F-H. The scores for these additional eligible pickup locations may be discounted to adjust for the different region, and if the scores are better than the other location data points, may be selected for the pickup.

Figure 5:
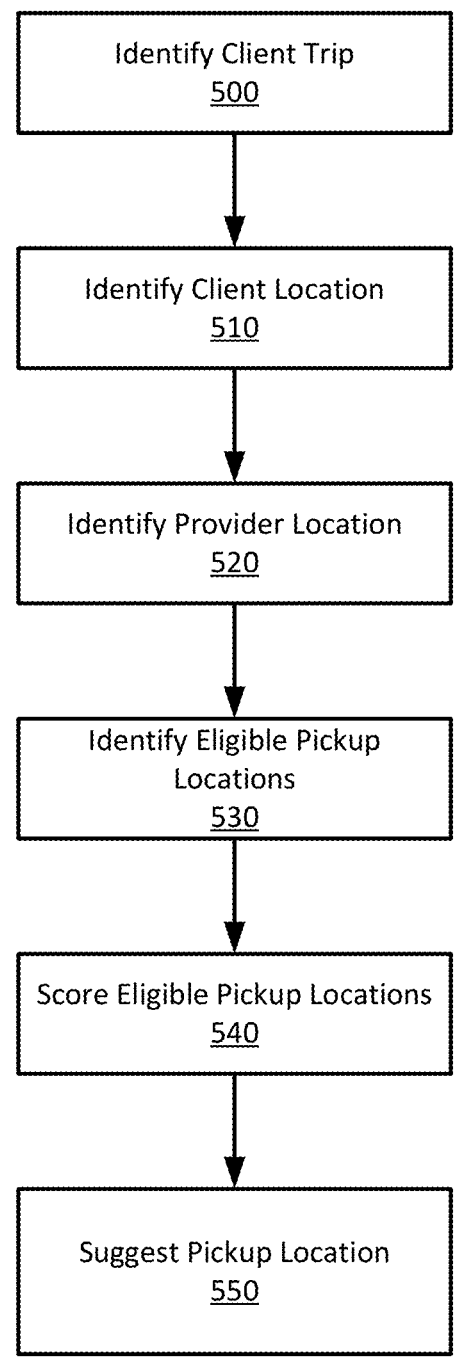
FIG. 5 illustrates an additional method for selecting a pickup location for a trip. In this example, a provider is already en route to pick up a client.

FIG. 5 illustrates an additional method for selecting a pickup location for a trip. In this example, a provider is already en route to pick up a client. This method may be used to evaluate alternative pickup locations to suggest to a client. Initially, a pending trip that has not yet begin (i.e., the client has not been picked up, but the trip has been requested) is identified for analysis of an alternate pickup location. All pending trips may be considered, or pending trips may be considered under certain conditions, such as prior to a client reaching the initial pickup location, trips for which the initial pickup location received a score indicating significant short-term delays (e.g., significant traffic), or trips for which the provider travels over a threshold distance to reach the client. To determine the alternate pickup location, the client's location is identified 510 as well as the provider's location 520. From the client's location, a set of location data points is determined, either within a threshold distance of the client's location as discussed in FIG. 3, or in an identified region of the client as discussed with respect to FIG. 4. The threshold distance considered in this method may be higher than the threshold distance (or at a higher level of a region hierarchy) previously considered for the initial selection of a pickup, for example to permit a client to more optionally decide whether to travel a further distance for an improved pickup. Location data points may also be excluded as an eligible pickup location when the travel time for a client to reach the location data point exceeds the travel time for a provider to reach the location data point. These location data points are considered as possible locations for an alternate pickup and scored 540 by determining the estimated time to arrive at the eligible pickup location from the provider's location and the time to arrive at the destination from the eligible pickup location. When another eligible pickup location has a reduced time from the pickup location currently selected for the trip, the eligible pickup location is selected as an alternative pickup location and suggested 550 to the provider and rider. The original pickup location of the trip may be maintained until the client and/or provider confirm (and/or reject) the alternate pickup location. In one example, the alternate pickup location is sent to the client and displayed for the client to accept the alternate pickup location. Any reduced time or cost (or an updated time of arrival, for example) for the trip relative to the alternate pickup location may also be displayed to the client. When the client accepts the alternate pickup location, the alternate pickup location is sent to the provider to update the provider's route to the alternate pickup location.

Figure 6A:
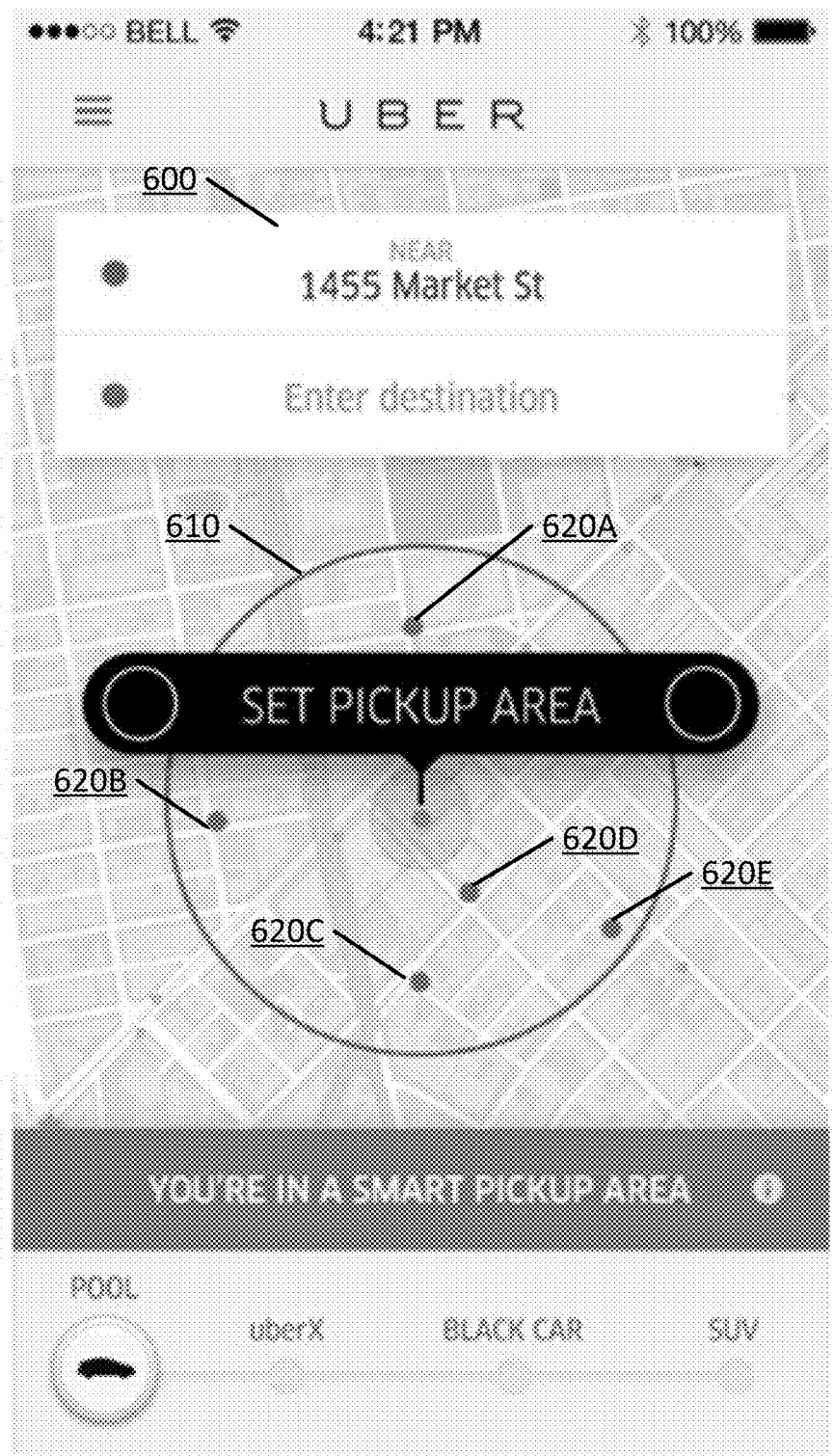

FIGS. 6A-6H illustrate example user interfaces of a client application that runs on a client device to coordinate a trip and view pickup locations. FIG. 6A illustrates an initial interface that enables a user to view information about a network service and make a request for a trip via an application executing on the client device 100. The initial user interface may include an indication that the user may be suggested a pickup location (i.e., "you're in a smart pickup area"). In addition, the current user's location may be identified and displayed to a user in a pickup location or region indicator 600, which may also include an interface for a user to enter a destination. In the example of FIG. 6A, the client location is, by default, at the location of the pin (e.g., the graphic indicator pointing to a location on the map user interface). However, the user may input an address or point of interest in the pickup indicator 600 and/or interact with the user interface to move the pin to another user-specified location, which can also cause the information in the pickup indicator 600 to be modified accordingly. Using the client location or the specified location, a circular distance 610 around the location is displayed around the location to display the range of predetermined eligible pickup locations near the user. In one embodiment, the circular distance 610 does not extend beyond the furthest eligible pickup location. In addition, an indication of the nearby locations 620A-320E may also be displayed. As described above, the eligible pickup locations may be provided to the client device and displayed to the client prior to the user making a request, entering a destination, and/or receiving information about the provider.

Figure 6B:
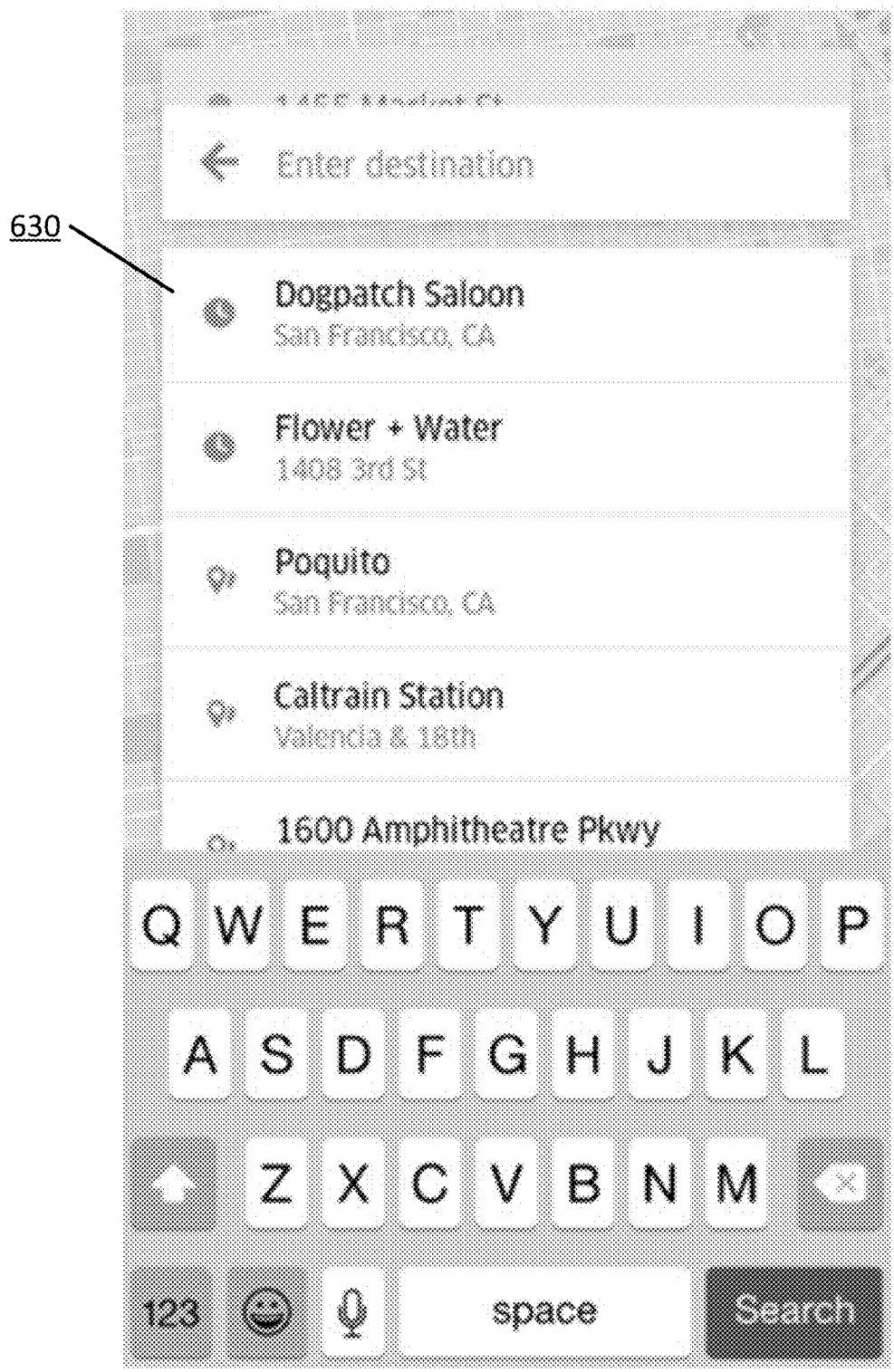
Figure 6C:

FIG. 6B illustrates a user interface when a user selects a destination indicator of FIG. 6A to select or input a destination. The user interface may display a set of possible destinations 630 and a search query interface element for a user to enter search terms for the destination. FIG. 6C illustrates a confirmation screen for a user to confirm the user's request for a service. According to an example, the confirmation screen can be displayed after the user selects the feature, "Set Pickup Area" on the user interface of FIG. 6A. The confirmation screen can provide the user with an opportunity to verify the information the user has provided, including the pickup region, the destination location, the vehicle type, the estimated route 650 to the destination location (e.g., as illustrated by the graphic indicator 660), and other details for the trip. In addition, the confirmation screen shown in FIG. 6C can also continue to illustrate the circular distance 640 and eligible pickup locations within the circular distance, indicating to the user visually the possible distance to a potential suggested pickup location, and indicating the total distance to the destination. In this example of FIG. 6C, the user may confirm to request a pooled trip to the destination.

Figure 6D:
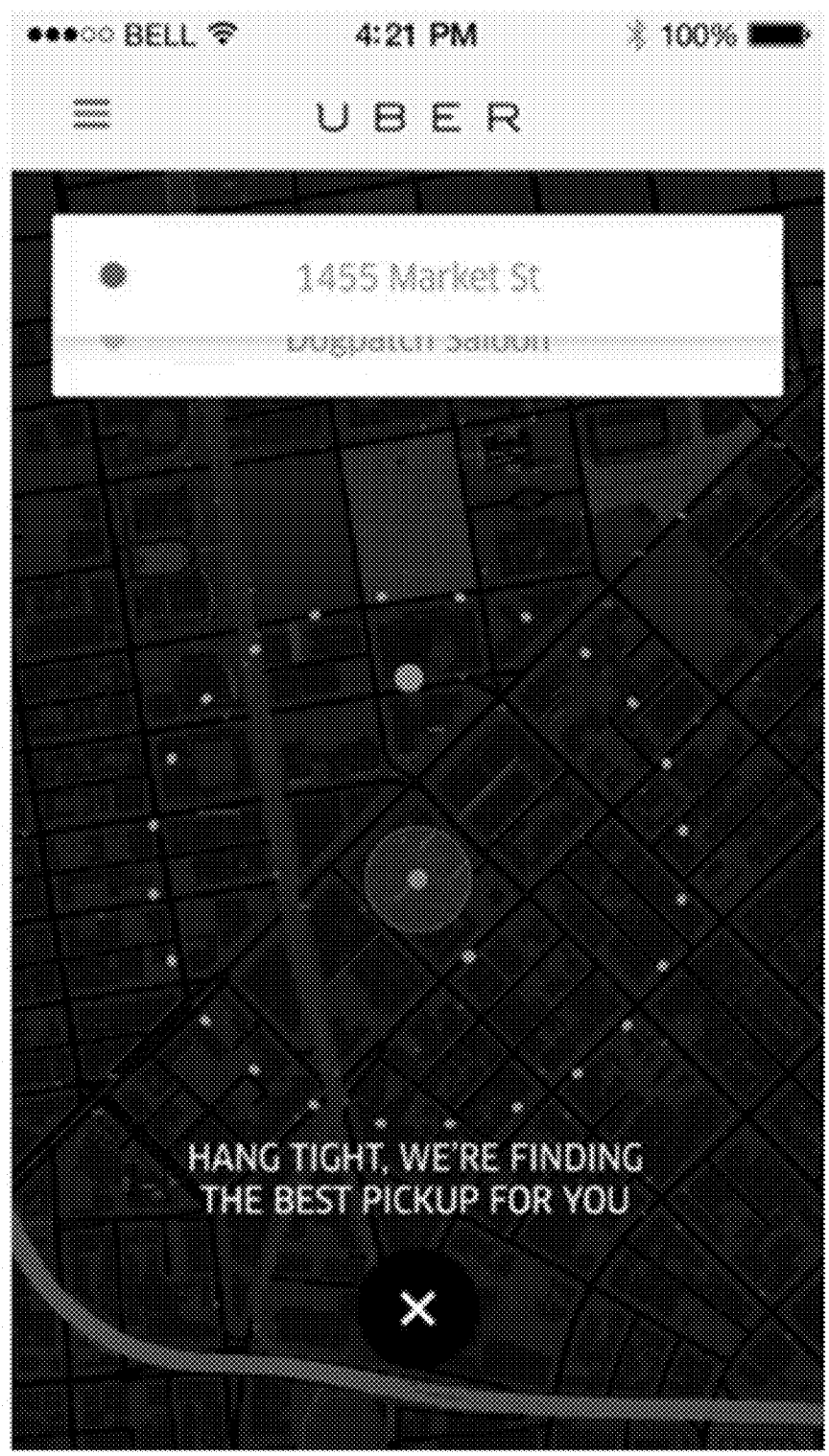
Figure 6E:
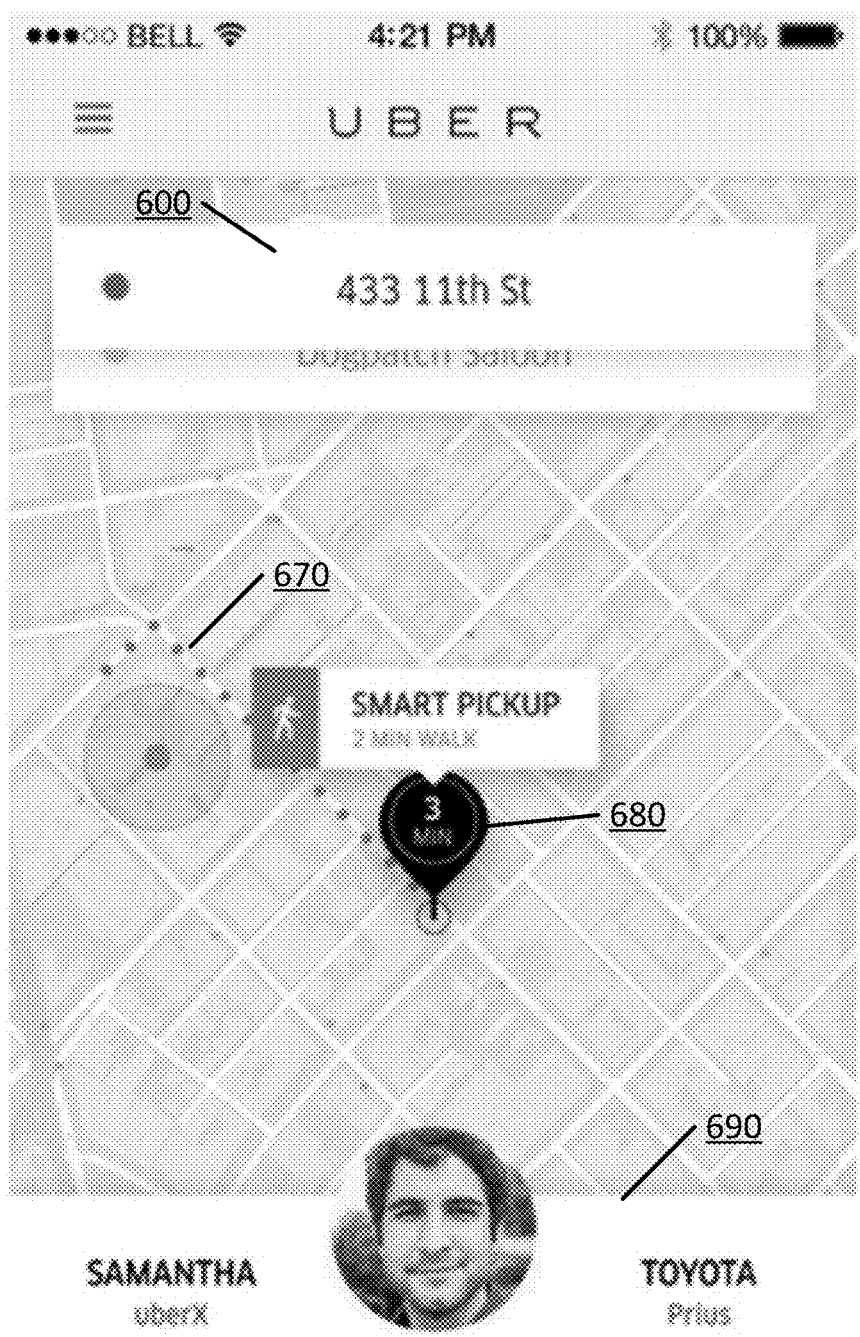

When the user makes the request for the service, an interface, as shown in FIG. 6D, may be displayed on the client device 100 to indicate to the user that a pickup location is being selected. As an addition or an alternative, the interface can also indicate that a provider is being selected for the user. After a pickup location and/or the provider is selected for the user, the walking directions are received by the client device 100 and displayed to the user, such as shown in the example of FIG. 6E. As shown in FIG. 6E, the walking interface may also display provider information 690, in addition to an indication of the pickup location 680 selected for the user, the estimated travel time to walk, and the path 670 for a user to travel to reach the pickup location 680. Still further, the pickup indicator can be dynamically adjusted to display information about the selected pickup location 680, such as an address, a street intersection, a building name, a point of interest name, etc., as compared to displaying information about a region corresponding to the originally specified location. For example, as reference, FIG. 6A had previously shown that the specified location provided by the user (as illustrated by the pin) corresponded to "1455 Market St" and subsequently, that the pickup location would be "NEAR" that location. In contrast, after receiving the selected pickup location, the client application can display the information of the selected pickup location in the pickup indicator 600.

FIGS. 6F-6H illustrate example user interfaces for updating a pickup location, for example after determining an alternate pickup location as discussed with reference to FIG. 5. As shown in FIG. 6F, an initial pickup location 620 may be determined for the client, for example based on a region as determined by a user's location in a building. Alternatively, the initial pickup location 620 may have been initially specified by the client. After consideration of alternate pickup locations, the travel coordination system 130 can determine an alternate pickup location based, at least in part, on the initial pickup location 620, the current location of the selected driver, the destination location of the client, and/or other information (e.g., pickup and/or destination locations of other clients in a shared pool vehicle type, traffic information, etc.) and provide information about the alternate pickup location 692 to the client's device. The alternate pickup location may also be shown with an improved travel time, in this case an improvement of six minutes from the initial pickup location. When a user interacts with the alternate pickup location (e.g., selects the graphic indicator of the alternate pickup location 692 or the selectable feature with the text "Meet in front of Wells Fargo on Grant Ave"), the application may display a confirmation panel as shown in FIG. 6G. When the user elects to update the pickup location by selecting the feature 694, an updated path indicator 670 from the initial pickup location 620 (or in another example, from the current location of the client) to the alternate pickup location 692 is displayed in the application. Information about the updated location (e.g., corresponding to the alternate pickup location 692) is also sent to the provider's device to adjust the provider's route to the client.

By providing the various pickup locations and permitting adjustments to the pickup locations after trips are initiated, the travel coordination system 130 can account for locations where clients actually initiate trips, and account for the ease of accessing different pickup locations for different regions, while maintaining flexibility to adjust for modified conditions. The use of the location data points based on prior trip pickups permits pickup locations to be automatically selected and minimizing additional coordination by clients and providers. In embodiments where the location data points are associated with regions, the identification of relevant location data points and the related scoring of eligible pickups may be reduced by automatically looking up eligible pickup locations from the region in which a user is located.

As an addition or an alternative, the travel coordination system 130 may also select a suggested destination for the trip using the location data points stored in the pickup location datastore 170. In this example, the suggested destination for a trip may be used to improve efficiency of a pooled trip, and to reduce extra time that a rider must travel when it is inconvenient for a provider to reach the exact destination of the trip. To determine the suggested destinations for a trip, the travel coordination system 130 may access the predetermined location data points near the specified destination of a trip to identify eligible destinations and similarly score and suggest one of these eligible destinations as a destination for the trip. To score the eligible destinations, the travel coordination system 130 may first determine the estimated time for the provider to reach the destination entered by the user. Next, for each eligible destination, the travel coordination system 130 may combine the estimated time for the provider to reach the eligible destination and the estimated time for the client to walk from the eligible destination to the client-selected destination. This estimated time for an eligible destination may be compared with the estimated time to reach the destination, and the eligible destination suggested to the user when it has a reduced time relative to the provider traveling to the client-selected destination itself. In additional examples, the estimated time to reach another destination for another client on the trip (i.e., for a pooled trip) for the destination and the eligible destination may also be included in the estimated time.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of implementing an on-demand transport service, the method being performed by one or more processors and comprising:

communicating, over one or more networks, with (i) computing devices of clients of the on-demand transport service, and (ii) computing devices of transport providers servicing the on-demand transport service;

receiving, over the one or more networks, a trip request for a carpool trip from the computing device of a respective client of the clients, the trip request indicating a destination;

receiving, over the one or more networks, real-time location data from a positioning system of the computing device of the respective client, the real-time location data indicating a current location of the respective client;

determining a set of eligible pickup locations proximate to the current location of the respective client, each pickup location in the set of eligible pickup locations comprising a location at which prior trips of the on-demand transport service have been initiated;

monitoring, over the one or more networks, real-time in-progress trip data of a plurality of the transport providers, the real-time in-progress trip data comprising (i) real-time location data, from positioning systems of the computing devices of the plurality of transport providers, indicating a current route of each transport provider of the plurality of transport providers, and (ii) an existing client currently being transported by each transport provider of the plurality of transport providers;

for each respective pickup location in the set of eligible pickup locations and for each transport provider of the plurality of transport providers, determining a total trip time for the transport provider to service the trip request, the total trip time comprising (i) an estimated time of arrival (ETA) for the transport provider to arrive at the respective pickup location, and (ii) an estimated time to destination (ETD) for the transport provider to transport the respective client from the respective pickup location to the destination;

for each respective pickup location of the set of eligible pickup locations and for each transport provider of the plurality of transport providers, (i) determining an amount of reduced time for utilizing the respective pickup location as opposed to the current location of the respective client or a pickup location specified by the respective client, and (ii) determining an expected increase in cost to reach a destination of the existing client based on picking up the respective client at the respective pickup location;

based on (i) the total trip time, (ii) the amount of reduced time, and (iii) the expected increase in cost for each respective pickup location and for each transport provider of the plurality of transport providers, selecting a transport provider from the plurality of transport providers and a trip pickup location from the set of eligible pickup locations to initiate the trip request;

transmitting, over the one or more networks, match data indicating the trip pickup location to the computing device of the selected transport provider and the computing device of the respective client to initiate the trip request; and monitoring, over the one or more networks, the current location of the selected transport provider for a duration that includes a pickup time when the trip request initiates and a drop-off time when the trip request is completed.

2. The method of claim 1, further comprising:
identifying a plurality of regions, each specified region of the plurality of regions corresponding to a geographical area and being associated with one or more eligible pickup locations; and
identifying a region from the plurality of regions based on the current location of the respective client;
wherein the set of eligible pickup locations for the respective client are associated with the identified region.

3. The method of claim 2, further comprising:
determining a condition affecting the set of eligible pickup locations of the identified region; and
based on the condition affecting the set of eligible pickup locations of the identified region, adding the one or more eligible pickup locations associated with a second region of the plurality of regions to the set of eligible pickup locations of the identified region.

4. The method of claim 3, wherein the condition comprises a short-term condition corresponding to at least one of traffic or construction.

5. The method of claim 3, wherein the identified region is a geographic subset of the second region.

6. The method of claim 2, wherein the one or more processors identify the plurality of regions based on a clustering of locations from which trips for the on-demand transport service have been requested.

7. The method of claim 2, wherein the one or more processors identify the one or more eligible pickup locations for each specific region in the plurality of regions based on location points from which trips have been initiated in the specific region.

8. A non-transitory computer-readable medium comprising instructions which, when executed by one or more processors of a network computer system, cause the network computer system to perform operations comprising:

communicating, over one or more networks, with (i) computing devices of clients of an on-demand transport service, and (ii) computing devices of transport providers servicing the on-demand transport service;

receiving, over the one or more networks, a transport request for a carpool trip from the computing device of a respective client of the clients, the trip request indicating a destination;

receiving, over the one or more networks, real-time location data from a positioning system of the computing device of the respective client, the real-time location data indicating a current location of the respective client;

determining a set of eligible pickup locations proximate to the current location of the respective client, each pickup location in the set of eligible pickup locations comprising a location at which prior trips of the on-demand transport service have been initiated;

monitoring, over the one or more networks, real-time in-progress trip data of a plurality of the transport providers, the real-time in-progress trip data comprising (i) real-time location data, from positioning systems of the computing devices of the plurality of transport providers, indicating a current route of each transport provider of the plurality of transport providers, and (ii) an existing client currently being transported by each transport provider of the plurality of transport providers;

for each respective pickup location in the set of eligible pickup locations and for each transport provider of the plurality of transport providers, determining a total trip time for the transport provider to service the trip request, the total trip time comprising (i) an estimated time of arrival (ETA) for the transport provider to arrive at the respective pickup location, and (ii) an estimated time to destination (ETD) for the transport provider to transport the respective client from the respective pickup location to the destination;

for each respective pickup location of the set of eligible pickup locations and for each transport provider of the plurality of transport providers, (i) determining an amount of reduced time for utilizing the respective pickup location as opposed to the current location of the respective client or a pickup location specified by the respective client, and (ii) determining an expected increase in cost to reach a destination of the existing client based on picking up the respective client at the respective pickup location;

based on (i) the total trip time, (ii) the amount of reduced time, and (iii) the expected increase in cost for each respective pickup location and for each transport provider of the plurality of transport providers, selecting a transport provider from the plurality of transport providers and a trip pickup location from the set of eligible pickup locations to initiate the trip request;

transmitting, over the one or more networks, match data indicating the trip pickup location to the computing device of the selected transport provider and the computing device of the respective client to initiate the trip request; and monitoring, over the one or more networks, the current location of the selected transport provider for a duration that includes a pickup time when the trip initiates and a drop-off time when the trip is completed.

9. The non-transitory computer-readable medium of claim 8, wherein the executed instructions cause the network computer system to perform further operations comprising:
identifying a plurality of regions, each specified region of the plurality of regions corresponding to a geographical area and being associated with one or more eligible pickup locations; and
identifying a region from the plurality of regions based on the current location of the respective client;
wherein the set of eligible pickup locations for the respective client are associated with the identified region.

10. The non-transitory computer-readable medium of claim 9, wherein the executed instructions cause the network computer system to perform further operations comprising:
determining a condition affecting the set of eligible pickup locations of the identified region; and
based on the condition affecting the set of eligible pickup locations of the identified region, adding the one or more pickup locations associated with a second region of the plurality of regions to the set of eligible pickup locations of the identified region.

11. The non-transitory computer-readable medium of claim 10, wherein the condition comprises a short-term condition corresponding to at least one of traffic or construction.

12. The non-transitory computer-readable medium of claim 10, wherein the identified region is a geographic subset of the second region.

13. The non-transitory computer-readable medium of claim 9, wherein the executed instructions cause the network computer system to identify the plurality of regions based on a clustering of locations from which trips for the on-demand transport service have been requested.

14. The non-transitory computer-readable medium of claim 9, wherein the executed instructions cause the network computer system to determine the one or more eligible pickup locations for each specific region in the plurality of regions based on location points from which trips have been initiated in the specific region.

15. A network computer system comprising:
a network communication interface to communicate, over one or more networks, with (i) computing devices of clients of an on-demand transport service, and (ii) computing devices of transport providers servicing the on-demand transport service;
one or more processors; and
a memory storing instructions that, when executed by the one or more processors, cause the one or more processors to:
receive, over the one or more networks, a trip request for a carpool trip from the computing device of a respective client of the clients, the trip request indicating a destination;
receive, over the one or more networks, real-time location data from a positioning system of the computing device of the respective client, the real-time location data indicating a current location of the respective client;
determine a set of eligible pickup locations proximate to the current location of the respective client, each pickup location in the set of eligible pickup locations comprising a location at which prior trips of the on-demand transport service have been initiated;
monitor, over the one or more networks, real-time in-progress trip data of a plurality of the transport providers, the real-time in-progress trip data comprising (i) real-time location data, from positioning system of the computing device of the plurality of transport providers, indicating a current route of each transport provider of the plurality of transport providers, and (ii) an existing client currently being transported by each transport provider of the plurality of transport providers;
for each respective pickup location in the set of eligible pickup locations and for each transport provider of the plurality of transport providers, determine a total trip time for the transport provider to service the trip request, the total trip time comprising (i) an estimated time of arrival (ETA) for the transport provider to arrive at the respective pickup location, and (ii) an estimated time to destination (ETD) for the transport provider to transport the respective client from the respective pickup location to the destination;
for each respective pickup location of the set of eligible pickup locations and for each transport provider of the plurality of transport providers, (i) determine an amount of reduced time for utilizing the respective pickup location as opposed to the current location of the respective client or a pickup location specified by the respective client, and (ii) determine an expected increase in cost to reach a destination of the existing client based on picking up the respective client at the respective pickup location;

based on (i) the total trip time for each respective pickup location, (ii) the amount of reduced time for each respective pickup location, and (iii) the expected increase in cost for each respective pickup location and for each transport provider of the plurality of transport providers, select a transport provider from the plurality of transport providers and a trip pickup location from the set of eligible pickup locations to initiate the trip request;

transmit, over the one or more networks, match data indicating the trip pickup location to the computing device of the selected transport provider and the computing device of the respective client to initiate the trip request; and monitor, over the one or more networks, the current location of the selected transport provider for a duration that includes a pickup time when the trip request initiates and a drop-off time when the trip request is completed.

\* \* \* \* \*